United States Patent [19]

Bruns et al.

[11] Patent Number: 5,139,245
[45] Date of Patent: Aug. 18, 1992

[54] JIG FOR SETTING UP AND CLAMPING WORK PIECES

[75] Inventors: Werner Bruns, Rastede; Helmut Eickhorst; Enno Wilken, both of Varel, all of Fed. Rep. of Germany

[73] Assignee: Deutsche Airbus GmbH, Bremen, Fed. Rep. of Germany

[21] Appl. No.: 710,671

[22] Filed: Jun. 5, 1991

[51] Int. Cl.⁵ .................................. B25B 11/00
[52] U.S. Cl. .................................. 269/21; 269/266; 269/297; 294/64.1
[58] Field of Search .............. 294/64.1, 65; 269/21, 269/71, 73, 266, 296; 279/3; 51/235; 248/262, 263

[56] References Cited

U.S. PATENT DOCUMENTS

| | | | |
|---|---|---|---|
| 2,198,765 | 4/1940 | Featherstone et al. | 269/21 |
| 2,573,542 | 10/1951 | Cherry | 269/71 |
| 3,711,142 | 1/1973 | Wolski | 294/64.1 |
| 4,491,306 | 1/1985 | Eickhorst | 269/21 |
| 4,527,783 | 7/1985 | Collora et al. | 269/21 |
| 4,934,671 | 6/1990 | Laninga et al. | 269/73 |

Primary Examiner—Robert C. Watson
Attorney, Agent, or Firm—Anderson, Kill, Olick

[57] ABSTRACT

A jig comprising a plurality of clamping heads arranged in an adjustment device, with each clamping head comprising two elements adjustable in different planes, with one of the actuating elements connected with a suction part which comes to contact the work piece and a vacuum thus pulls the work piece towards this clamping head. The adjustment arrangement is laid out in such a way that each clamping head is movable in elevational, longitudinal, and transverse directions and because of its adjustment possibility any position on the work piece to be machined is accessible.

9 Claims, 6 Drawing Sheets

JIG FOR SETTING UP AND CLAMPING WORK PIECES

The invention is directed to a jig or fixture for setting up and clamping of work pieces, and in particular for clamping for machining operations spherically-preformed thin-walled sheet metal parts.

BACKGROUND OF THE INVENTION

When machining spherically-preformed, thin-walled sheet metal parts, as for instance, skin cover sheets of aircraft, it is necessary that the support contact points of such a work piece conform precisely to the shape of the work piece itself while it is being machined, in order to avoid local deformation. To achieve this, a clamping device arranged in a horizontal plane is known from the DE-PS 31 26 720. This known device comprises a head held in a locally fastened base portion together with a negative pressure unit. The clamping element is formed by a receptacle in the form of a semi-spherical shell, which is supported to be movable in a cup-shaped recess of the head. The receptacle is elastically retained at the head by means of a tension spring. Such an embodiment of a clamping device is limited to an arrangement for skin cover sheets to be clamped in a horizontal plane or the like, since the fastening of the clamping element proper with the head is achieved only by means of a tension spring.

SUMMARY OF THE INVENTION

A principal object of the invention is apparatus serving as a jig or fixture for setting up and clamping of large area skin cover sheets or the like, and which can also be used for metal sheeting of different spherical shapes to be clamped in a vertical plane, while this sheeting is securely held by means of a negative pressure clamping unit.

In accordance with one aspect of the present invention, means are provided such that any position of the clamping element with respect to the metal sheet can be adjustable by means of an adjusting device.

In accordance with another aspect of the invention, the adjustability is achieved with two elements adjustable in different planes, with the result that the clamping head which supports the work piece is movable along any axis of a threeaxis coordinate system.

The main advantages achieved by the invention consist in being able to transport the skin cover sheets to be machined, having spherical shapes and the like, in a suspended or hanging state, meaning vertically, by being clamped by the jig so as to be able to machine it vertically.

In a preferred embodiment according to the invention, a clamping head or chuck integrated into an adjustment device is used. It comprises two adjustment elements, which can be conformally matched to each other on circular arc-shaped guide paths to the spherical shape of the skin cover sheeting. A suction element facing the skin cover sheeting is connected to the adjustment element, with a valve arrangement for negative pressure being arranged in the suction element. This valve unit enables a negative pressure to be generated relative to the metal sheeting to be clamped, so that no air is aspirated only when the skin covering sheeting has achieved a correctly positioned support with respect to the clamping head.

The clamping heads or chucks, by being retained in the adjustment arrangement, can be distributed at nearly uniform spacings across the surface of the skin cover sheeting. This arrangement comprises essentially arms receiving and supporting the clamping heads and being displaceable in transverse and vertical directions, and thus the heads can be supported in vertical columns of the jig, which columns are held in a stand or frame of the jig so as to be displaceable in the longitudinal direction.

An optimum support of the workpiece is achieved by local positioning of the clamping heads by the adjustment device and by the inclination of the clamping heads so as to be adapted to the spherical shape of the skin cover sheeting, which results in secure machining and processing such as drilling, milling of templates, cutting with lasers, and application of lacquer.

The adjustment or traversing movements of the clamping heads in the jig can be performed manually or mechanically. An indication of the position of the clamping head can occur visually, or by means of an electrical travel measuring system. Adjustment for a particular set-up can be also executed by a computer program.

To secure the clamping head against overturning when skin cover sheeting arranged in a horizontal plane is to be machined, retaining wires penetrating through the suction element are provided. The wires are locally fastened at their ends. These retaining wires have a small diameter and great flexibility, so that they do not hinder adapting the clamping head to the workpiece.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

DETAILED DESCRIPTION OF THE PREFERRED EMBODIMENTS

Figure 1:
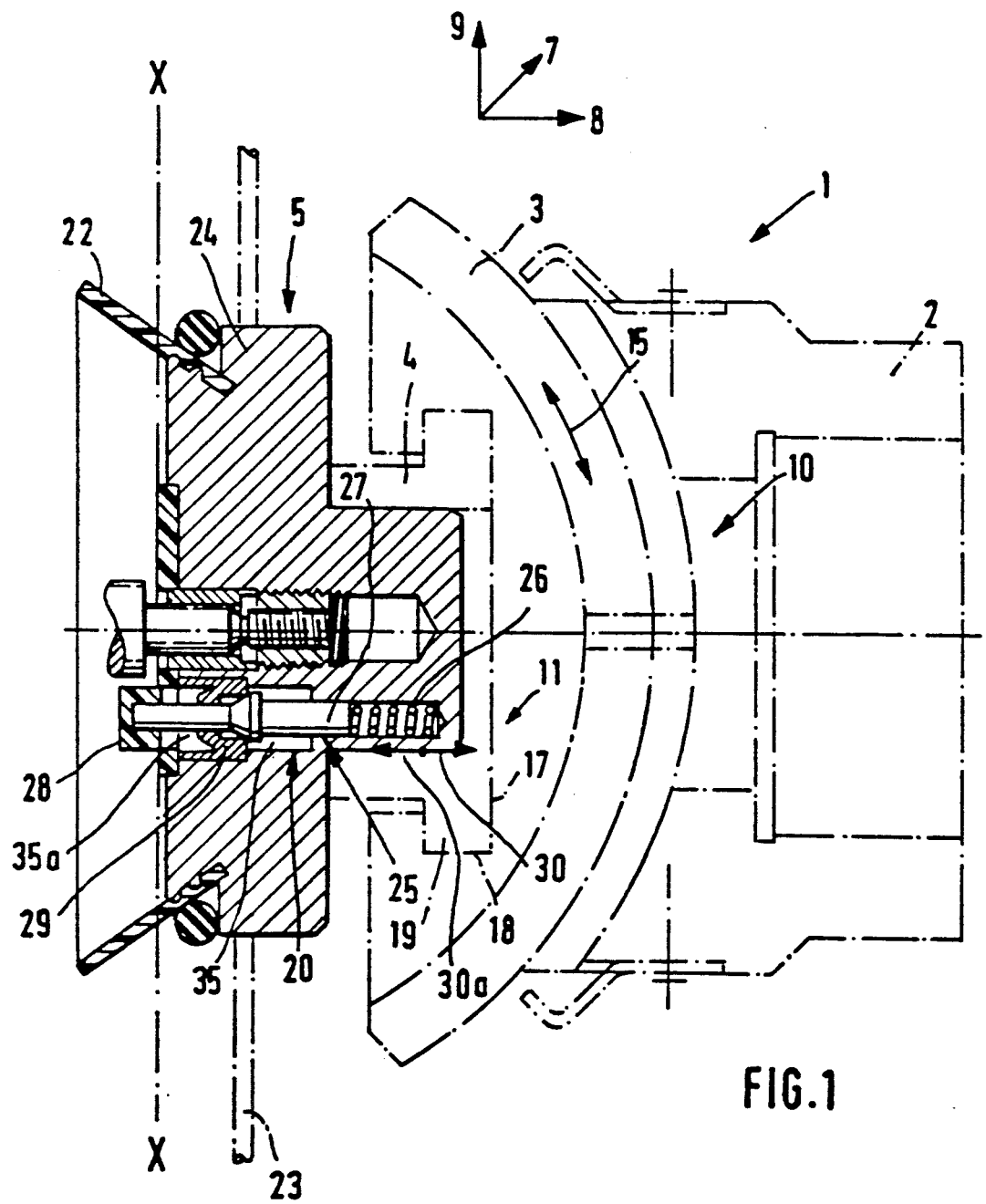
FIG. 1 is a side view of a horizontally arranged clamping jig according to the invention, comprising essentially a clamping head with a base member and two adjustment elements, with a suction element shown partially in section.

FIG. 1 shows a clamping head or chuck 1 comprising a base member 2 as well as first and second adjustment elements 3 and 4 and a suction element 5. The base member 2 is mounted in such a way with an adjustment device 6 (FIG. 11) that adjustment of the clamping head 1 in directions of the arrows 7, 8 and 9, meaning in longitudinal, transverse and elevation direction, is possible.

The adjustment elements 3 and 4 of the clamping head or chuck 1 are arranged on circular arc-shaped flat or shallow guides 10 and 11 so as to be mobile with respect to each other in such a way that any adjustment with respect to the spherical shape of the skin cover sheeting to be clamped is possible. The base member 2 comprises for this purpose a flat guide 10 which includes one circular arc-shaped groove 12 (FIG. 2) with undercut segments 13, with the groove 12 extending in a concave manner; all this is shown in detail in FIGS. 2 and 3–5. A ridge 14 of the first adjustment element 3 engages into this groove 12, which ridge has also an appropriate concave arc-shaped extent, and which allows a swivel motion of the first adjustment element 3 in the base member 2 in the directions of the arrows 15 (FIG. 1).

The second adjustment element 4 is shown in detail in FIGS. 1 and 6–8 and is retained in the first adjustment element 3 so as to be also displaceable in a concave circular arc-shaped flat guide 11. These flat guides 10 and 11 cross or overlap each other at an angle of 90°, so that the second adjustment element 4 is swivelable in the first adjustment element 3 in the directions of the arrows 16 (FIG. 2).

The flat guide 11 of the second adjustment element 4 comprises a groove 17 with undercut segments 18, into which engages a ridge 19 of the second adjustment element 4. The suction element 5 proper is connected with this element 4. This suction element 5 includes a valve arrangement 20, an appropriate supply channel 21 for the negative pressure and a sealing boot 22.

Figure 2:
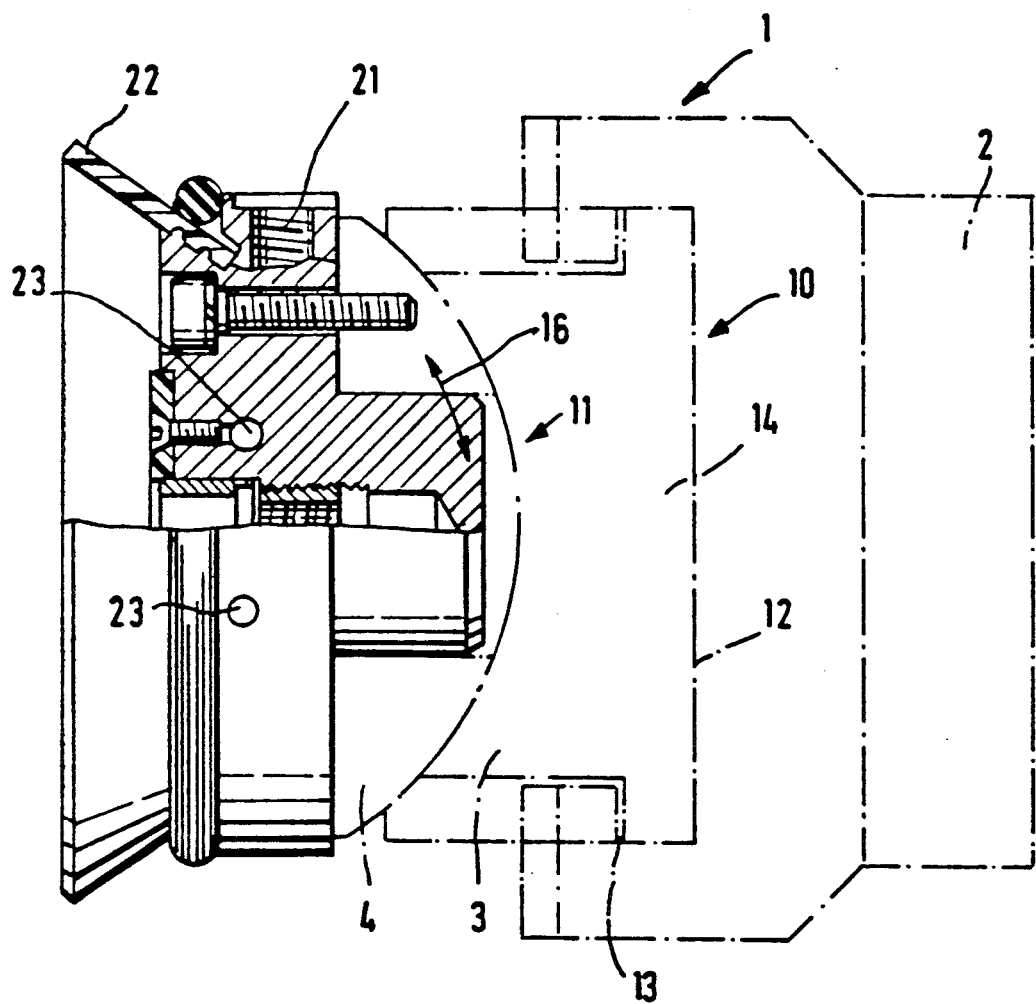
FIG. 2 is a plan view of the clamping head of FIG. 1.
Figure 3:
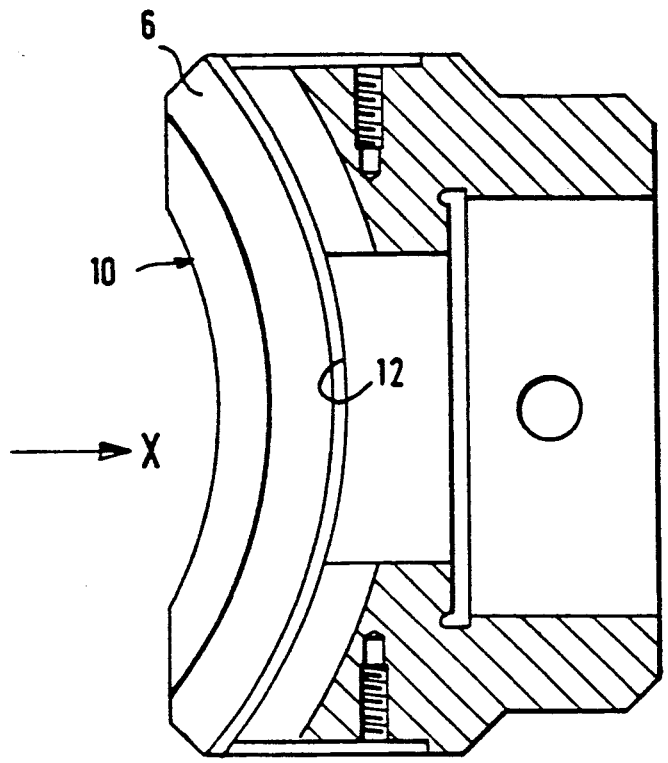
FIG. 3 shows the base member of the clamping head in front view according to FIG. 1 and partially in section.
Figure 4:
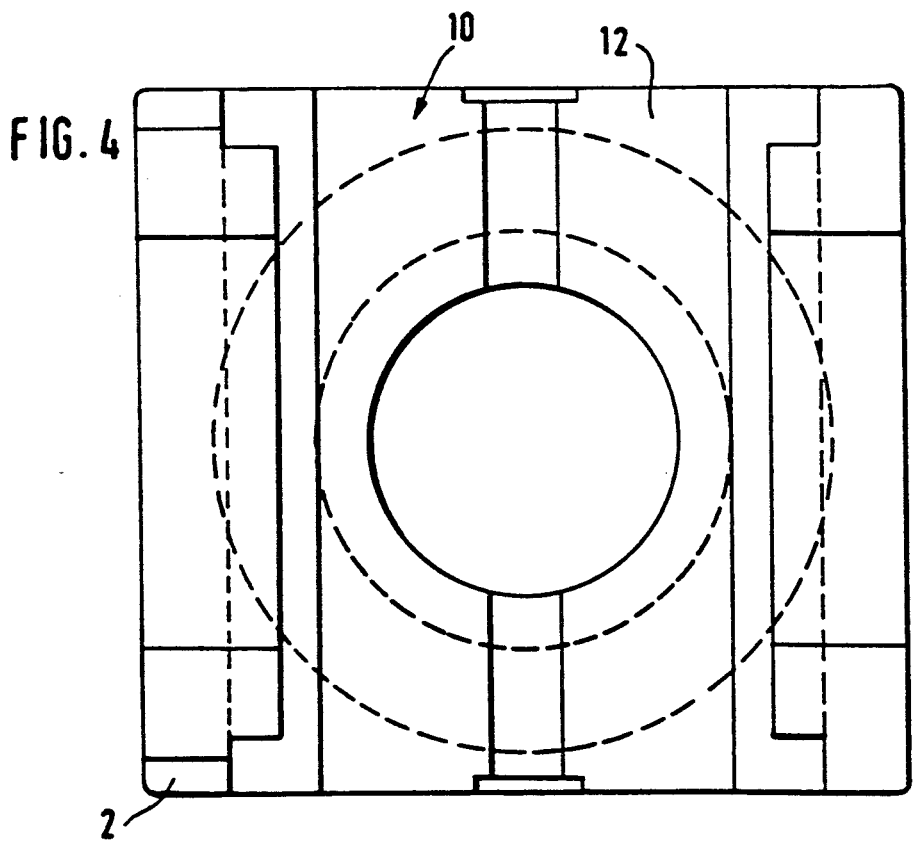
FIG. 4 is a front view in the direction of the arrow X upon the base member according to FIG. 3.
Figure 5:
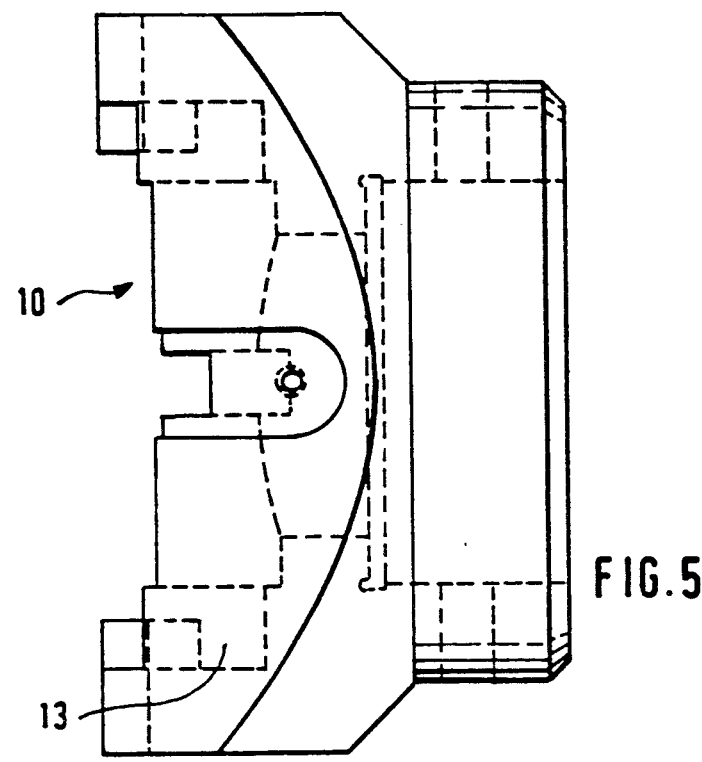
FIG. 5 is a plan view of the base member of FIG. 3.
Figure 6:
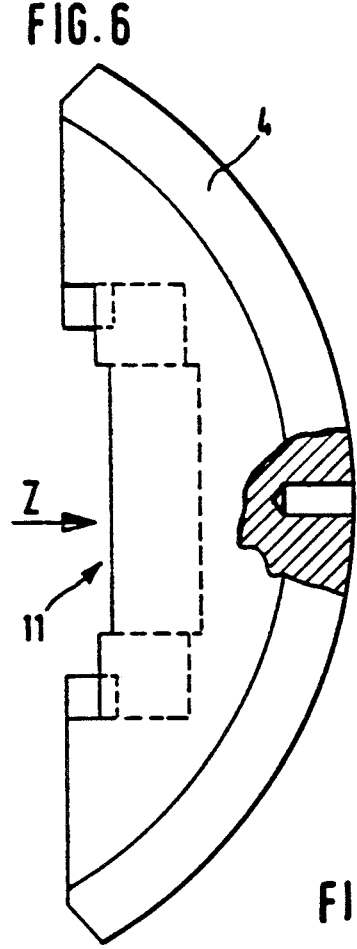
FIG. 6 shows a first adjustment element of the clamping head or chuck in a front view of FIG. 2.
Figure 7:
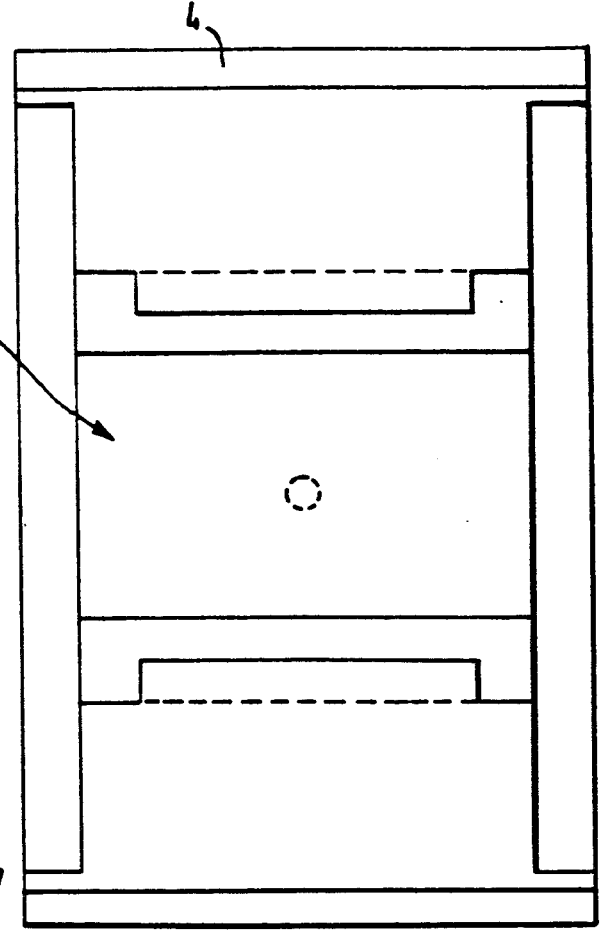
FIG. 7 is a front view upon the base member in the direction of the arrow Z of FIG. 6.
Figure 8:
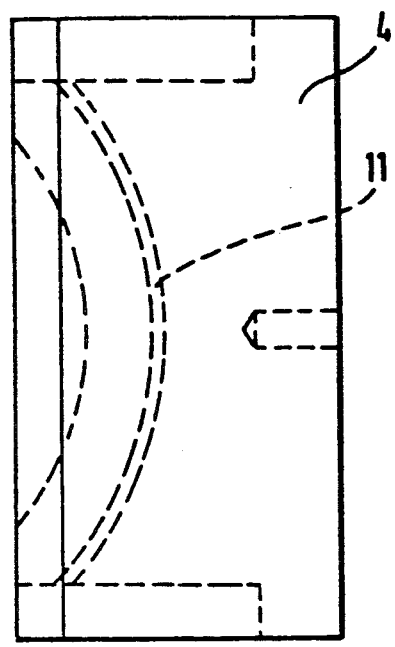
FIG. 8 is a plan view relating to FIG. 6.
Figure 9:
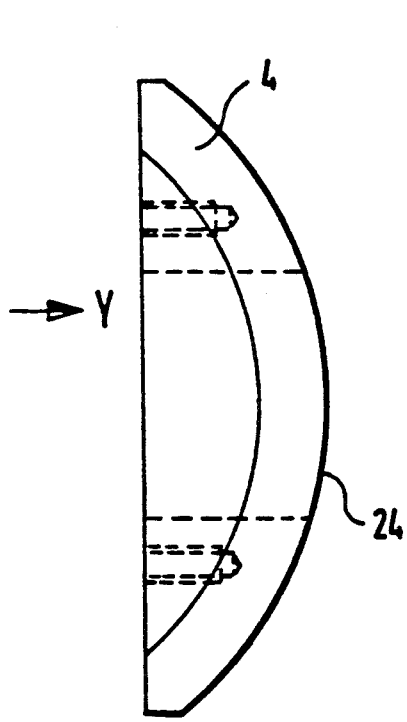
FIG. 9 is a side view of the second adjustment element.
Figure 10:
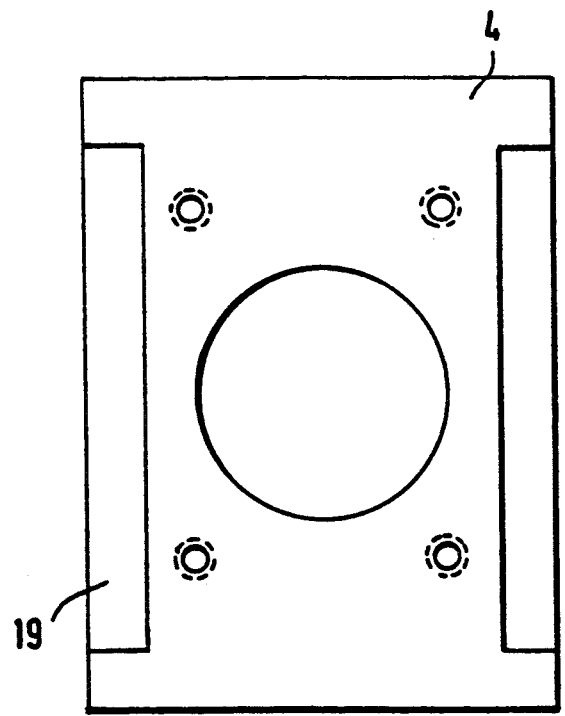
FIG. 10 is a front view of the second adjustment element in the direction of the arrow Y of FIG. 9.

In FIGS. 1 and 2 the clamping head 1 is shown set up in a horizontal plane. This arrangement of the head 1 serves for clamping sheets in a vertical plane. With a setup of the clamping head in a horizontal plane the adjustment arrangement 6 (FIG. 11) where the clamping heads are retained, is appropriately rotated through 90°. In this horizontal clamping position of the sheets, in which the clamping heads 1 assume a vertical position, retaining wires 23 are used in order to avoid an uncontrolled tipping of the heads 1, which wires penetrate through a support member 24 of the suction element 5 and are locally fixed. The retaining wires 23 extend at right angles to the longitudinal axis of the suction element 5. When the suction element 5 is arranged vertically, the retaining wires 23 are arranged to extend approximately horizontally or parallel to each other on both sides of the longitudinal axis Lo of a vertically arranged suction element 5.

The valve arrangement 20, located at the support member 24, comprises a ball valve 25, which in its closed position is loaded by a spring 26. A probing member 28 is connected to the end of a shaft 27 of the valve 25, which probing member projects beyond the clamping plane X-X of the work piece in the closed position of the valve 25 and holds the valve 25 in an airtight closed position by means of its valve seat ring 29. When the valve 25 is displaced by the probing head 28 upon contact with the skin sheeting, the valve 25 will move in the direction of the arrow 30 counter to the spring load 26; thereupon a vacuum can be produced between the metal sheet and the sealing boot 22 through the line 21 leading to a pump and the work piece can be fixed ready for machining. When the pump is switched off the valve will move into a closed position in the direction of the arrow 30a, and the probing head 28 leaves the bore 35a in the support member 24.

Figure 11:
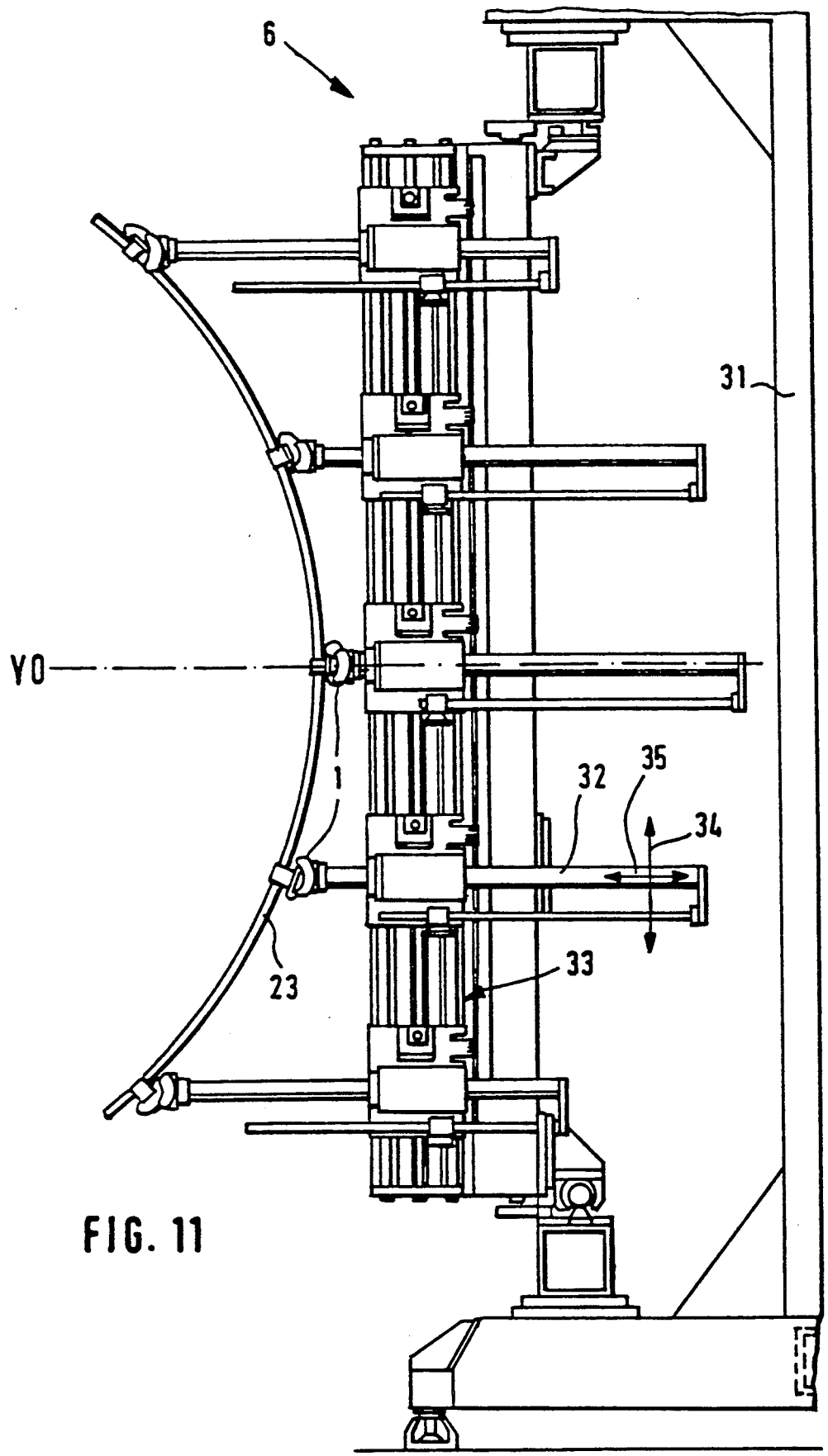
FIG. 11 is a side view of the adjustment arrangement with integrated clamping heads and supports.

The adjustment device 6 in FIG. 11 is held in a stand 31 and comprises a plurality of support arms 32 for a plurality of the clamping heads 1. The support arms 32 are held in vertical backups 33 and can be adjusted relative to the support 33 in elevational 34 and in transverse directions 35. Furthermore, the vertical backups 33 for the support arms 32 can be moved in a longitudinal direction in the stand 31, so that any possible position of a metal sheet 36 to be machined is achievable by this adjustment geometry in connection with the adjustment possibility of the clamping heads 1. FIG. 11 shows the various clamping heads holding a workpiece, with the clamping heads arranged in different orientations and positions in order to secure tightly the workpiece.

While the invention has been described in connection with preferred embodiments, it will be understood that modifications thereof within the principles outlined above will be evident to those skilled in the art and thus the invention is not limited to the preferred embodiments but is intended to encompass such modifications.

We claim:

1. Apparatus for setting up and clamping of workpieces, especially large area workpieces of small wall-thickness, wherein the work piece to be machined is retained by negative pressure clamping units which respectively comprise a base member, a clamping head with a suction element mounted on the base member in such manner so as to be swivelable with respect to the base member, and further comprising a negative pressure unit with a valve arrangement connected to the suction element, characterized in that the clamping head comprises first and second adjustment elements each having and being supported on circular arc-shaped guide means so as to be movable with respect to each other, said base member having a first guide means engaged by the first adjustment element so as to be displaceable in a first guide path, said first adjustment element having a second guide means engaged by the second adjustment element so as to be displaceable in a second guide path, said first and second guide paths extending so as to cross each other at an angle of about 90°, said first guide means including a concave groove in the base member, extending in a circular arc-shaped manner with undercut segments, and the first adjustment element comprising a corresponding circular arc-shaped ridge engaging the concave groove in the base member, said second guide means including a concave groove in the first adjustment element, extending in a circular arc-shaped manner with undercut segments, and the second adjustment element comprises a corresponding circular arc-shaped ridge engaging the concave groove in the first adjustment element.

2. Apparatus according to claim 1, characterized in that a support member for the suction element is provided, said valve arrangement being located in the support member of the suction element and comprising a spring-loaded needle valve terminating in a vacuum-suction channel, said valve being displaceable from a closed position into a vacuum-open position in response to the position of the work piece to be retained upon the suction element.

3. Apparatus according to claim 2, characterized in that the needle valve comprises a probing head at its free end facing away from the spring loading, said probing head extending beyond a clamping plane of a work piece in the clamping head's closed position and in the clamped position of the work piece being displaced inwardly to actuate said valve from its closed to its vacuum-open position.

4. Apparatus according to claim 1, characterized in that means are provided for adjustably retaining the clamping heads so as to be displaceable in elevational, transverse and longitudinal directions.

5. Apparatus according to claim 4, characterized in that the means for adjustably retaining comprises a stand, vertical columns on the stand, and a plurality of support arms respectively carrying a clamping head, with the support arms being arranged in a horizontal plane.

6. Apparatus according to claim 5, characterized in that the vertical columns are arranged to be displaceable in the stand in the longitudinal direction of the adjustment arrangement.

7. Apparatus according to claim 6, characterized in that the displacement motions of the clamping head in the stand occurs mechanically and that positions can be registered by electronic travel measuring systems.

8. Apparatus for setting up and clamping of workpieces, especially large area workpieces of small wall-thickness, wherein the work piece to be machined is retained by negative pressure clamping units which respectively comprise a base member, a clamping head with a suction element mounted on the base member in such manner so as to be swivelable with respect to the base member, and further comprising a negative pressure unit with a valve arrangement connected to the suction element, characterized in that the clamping head comprises first and second adjustment elements each having and being supported on circular arc-shaped guide means so as to be movable with respect to each other, said base member having a first guide means engaged by the first adjustment element so as to be displaceable in a first guide path, said first adjustment element having a second guide means engaged by the second adjustment element so as to be displaceable in a second guide path, said first and second guide paths extending so as to cross each other at an angle of about 90°, furthermore, a support member being provided for the suction element, said suction element comprising retaining wires arranged at a right angle to its longitudinal axis, said retaining wires having a relatively small diameter and penetrating through said support member and being respectively locally fixed on their ends so as to hold the clamping head in position.

9. Apparatus according to claim 8, characterized in that the retaining wires are arranged to extend approximately horizontally and parallel to each other on both sides of the longitudinal axis of a vertically arranged suction element.

* * * * *